United States Patent Office 3,756,831
Patented Sept. 4, 1973

3,756,831
MODIFIED SKIM MILK AND PROCESS FOR ITS PREPARATION
Winston Harold Wingerd and Russell D. Damisch, Elgin, Ill., assignors to Borden, Inc.
No Drawing. Filed Jan. 6, 1971, Ser. No. 104,453
Int. Cl. A23c 9/00
U.S. Cl. 99—54                                    18 Claims

ABSTRACT OF THE DISCLOSURE

A protein-modified skim milk product which can bind 4 to 5 times as much, and more, water as unmodified skim milk, is prepared by admixing 1 to 30 parts by weight of condensed skim milk solids with one part of lactalbumin or lactalbumin phosphate or a mixture thereof and up to 2.5% of a reducing agent, on total solids basis; heating the mixture at 140° F. to 220° F. to develop complexes; adding enough alkali to raise pH of the mixture within the range of from 7.5 to 9.5 while maintaining the mixture at 130° F. to 150° F. for a period sufficient to rehydrate the complexes; and spray-drying the mixture to form a free-flowing powder product.

---

This invention is based on the discovery that lactalbumin or lactalbumin phosphate, when heated with condensed skim milk, forms complexes with the skim milk casein micelles and renders them less soluble, thus allowing the complexes to precipitate. The precipitated complexes contain all of the calcium and phosphorus originally present in the casein micelle. When pH of the mixture containing the complexes is adjusted to between 7.5 and 9.5 at a temperature of 130° F. to 150° F., the complexes are hydrated and retain much of this hydration after pH is lowered to between 7 and 8 by the addition of lactalbumin phosphate or any carboxylic acid. Upon spray-drying, the protein-modified skim milk powder can absorb and bind at least 4 to 5 times as much water as regular, un-modified skim milk powder.

Some of the more important applications for the protein-modified skim milk include cream fillings such as marshmallow cream fillings, baked products such as sweet rolls where it is desired to extend shelf life, and comminuted meat products such as sausages and frankfurters where it is desired to retain moisture for a longer period of time. Since modified skim milk binds more water than regular or unmodified skim milk, a lesser amount is required to accomplish the same result. An example of this is demonstrated in the preparation of marshmallow cream filling which consists of lightly creaming a mixture of the following ingredients:

40 lbs. confectionary sugar
4 lbs. skim milk solids
28 lbs. high ratio shortening
8 ozs. salt
4 ozs. vanilla
3 lbs. cold water then adding 15 lbs. of marshmallows and lightly whipping the mixture. If the above recipe is prepared with the protein-modified skim milk described herein, only one pound of the modified skim milk solids would be required in place of the four pounds of the unmodified skim milk solids.

In addition to the advantage of having to use a much smaller amount, the use of modified skim milk produces a filling with better physical handling properties, i.e., it is drier and much better adapted to manufacturing processing in that it does not stick to agitator or sides of the kettle.

Skim milk generally contains less than 0.01% butter fat and about 8.5 to 9.5% solids. Skim milk is obtained by pumping whole milk through a cream separator or centrifuge where cream is separated from skim milk. Since melting point range of butterfat is about 70° F. to 85° F., temperature of whole milk introduced into the cream separator should be above 100° F. so that the butterfat is in a liquid state. Size of opening through which cream is withdrawn will determine amount of butterfat in the cream. Cream generally contains 36% butterfat, but can be as high as 44%.

Skim milk collected from the cream separator, having a pH in the range of about 6.4 to 6.8, is pumped to an evaporator where it is condensed to any desired solids concentration. For purposes of this invention, the solids concentration of condensed skim milk should be 30–45%, and preferably 38–42%. Skim milk is then cooled to below 80° F. If lactalbumin or lactalbumin phosphate is added to condensed skim milk which is at a temperature in excess of about 80° F., it will react with casein in the skim milk and will gelatinize if allowed to stand for more than about 15 minutes. Skim milk may contain 90.50% water and 9.50% solids, of which solids, on the basis of skim milk, 5.05% will be lactose, 3.60% will be nitrogenous matter, 0.75% ash and 0.10% fat. Of the 3.60% nitrogenous matter in the skim milk, 2.65% will be casein, 0.70% whey protein (lactalbumin) and 0.25% non-protein nitrogenous matter, all based on the skim milk.

The reaction between lactalbumin or lactalbumin phosphate is essentially that with the skim milk solids, and more specifically, with the casein proteins in skim milk. The lactalbumin normally present in skim milk takes part in this reaction with casein, however, the natural level of lactalbumin in skim milk is not sufficiently high to cause more than a small increase in viscosity, i.e., increase the water-binding capacity of the casein, when the condensed skim milk is processed. It is only when the ratio of lactalbumin to casein is increased to about twice the normal level in skim milk that a marked increase in viscosity results when the skim milk is processed as outlined herein.

Whey protein or lactalbumin, which denotes a number of related proteins, is water soluble and includes mainly beta-lactaglobulin and alpha-lactalbumin. Isoelectric point of lactalbumin has an average value of a pH of about 5.

Lactalbumin phosphate is prepared by acidifying whey to a pH below the isoelectric point of lactalbumin and heating whey preferably to a temperature between 110° F. and 140° F. in order to obtain higher dehydration of precipitate to facilitate precipitation and separation in a centrifuge. Although a temperature range of 110° F. to 140° F. is preferred, operable range is 40° F. to 170° F. Heating of whey should be conducted at a temperature below that which will denature or coagulate lactalbumin and 170° F. is just about the upper limit. An aqueous phosphate solution is added to the heated whey to precipitate lactalbumin phosphate which is separated by filtration or centrifuging.

Lactalbumin phosphate, as such, exists below the isoelectric point of lactalbumin, which is about a pH of 5. Lactalbumin phosphate can be dissociated and lactalbumin recovered by raising pH of lactalbumin phosphate solution above 5, and preferably to 6.3. After dissociation, phosphate ions are removed in an electrodialysis apparatus and lactalbumin solution, still containing some lactalbumin phophate, is spray-dried.

Assuming that all of the polymeric phosphate ions have been removed, lactalbumin in solution cannot any longer be precipitated by acidifying the solution below the isoelectric point of lactalbumin. Precipitation will occur only to the extent that the polymeric phosphate ions are present in the lactalbumin solution.

A reducing agent can be used to improve the water-binding capacity of the modified skim milk, although its use is optional. Presence of a reducing agent lowers coagulation temperature of lactalbumin which allows formation of the complexes at a lower temperature, which complexes have a potential of being hydratable to a higher degree.

The process of preparing protein-modified skim milk involves mixing cold condensed skim milk, preferably in an aqueous solution of 38–42% solids concentration, with lactalbumin or lactalbumin phosphate and, optionally, aqueous solution of a reducing agent suitable for use in food products such as sodium sulfite, sodium bisulfite, sodium hyposulfite, cystiene, butylated hydroxytoluene, dilauryl thiodipropionate, ascorbic acid, erythorbate, sodium or calcium ascorbate, butylated hydroxyanisole, lecithin, gum guaiac, oat gum, propyl gallate, and others which are listed in "Chemicals Used in Food Processing," Publication 1274 by National Research Council of the National Academy of Sciences. Use of cold condensed skim milk, i.e., condensed skim milk at temperature below 80° F., is recommended in order to avoid reaction between the ingredients while they are being dispersed. If warm condensed skim milk were to be used, reaction would set in which would increase viscosity of the mixture thus making it more difficult to properly mix the ingredients. Although it is more practical to add all of the ingredients to a kettle at one time, they can be admixed separately.

From 1 to 30, and preferably 2–20 parts by weight of skim milk solids are used for every part of lactalbumin or lactalbumin phosphate. Amount of reducing agent may range from 0% to 2.5% on solids basis and preferably, from 0.5% to 2.0%. Amount of reducing agent in excess of 2.5% should be avoided since such amount will impart hydrogen sulfide or rotten egg quality to the product when any of the sodium sulfites, as reducing agents, are used.

Lactalbumin or lactalbumin phosphate may be added as a powder or an aqueous slurry containing two parts water for every part of lactalbumin or lactalbumin phosphate. Mixing of condensed skim milk, lactalbumin or lactalbumin phosphate and the reducing agent is continued for 5 to 10 minutes until a uniform dispersion of ingredients is obtained. If lactalbumin phosphate is used, pH of the mixture will be in the range of 5 to 7 and more specifically, 5.5 to 6.0. Since pH will vary when lactalbumin is used, the pH must be adjusted to this range with lactalbumin phosphate which has a pH of below about 5, or with any carboxylic acid, examples of which are given later in this disclosure. The pH of the mixture is adjusted to the range of 5 to 7 since casein micelle, containing most of calcium and phosphorus in skim milk, would lose calcium at a pH below 5, which is undesirable. Although this calcium would be replaced by a cation of an alkaline agent used during neutralization, this cation will not be calcium, as is explained below. The pH on the high side is limited to 7 because above this limit, browning and flavor problems in the product would be encountered at higher temperatures.

The mixture is then heated for a period of time in the range from a couple of hours to a few seconds to a temperature in the range of 140° F. to 220° F., and preferably from 180° F. to 200° F., in order to promote a quick reaction between lactalbumin or lactalbumin phosphate with the whey proteins in the skim milk. For the preferred temperature range, the heating period is under five minutes and generally, 0.5 to 4 minutes. At temperatures below about 140° F., the reaction is generally too slow and at temperatures above about 220° F., a hard curd is formed which is difficult to rehydrate. As formation of complexes proceeds, a curd is formed which becomes progressively heavier. The reaction must be terminated before a non-rehydratable curd is formed, which can be determined by experimentation. This heating step can also be accomplished by pumping the mixture through a steam injector maintained at the desired temperature. After heating the mixture, it is returned to a vessel where it may be admixed with cold water in order to dilute it to a solids concentration in the range of 20 to 40%, and preferably from 25 to 35%. Although the dilution step is optional, it should be utilized since it facilitates agitation and the resulting product has better rehydration property.

In order to promote rehydration of the formed complexes, a strong monovalent cation alkali is added with agitation to adjust pH of the mixture to from 7.5 to 9.5, preferably 8 to 9, while the mixture is maintained at a temperatre below about 150° F. for at least 2–5 minutes, and generally 15 to 60 minutes. The temperature is generally in the range of 130° F. and 150° F. and should be below 150° F. when the alkali is added in order to avoid discoloration of the product. The object here is to maintain as high a temperature as possible without jeopardizing quality of the product because a product of higher water-binding capacity is obtained at high temperatures. Examples of suitable alkalies are potassium hydroxide, sodium hydroxide and ammonia. Calcium hydroxide and magnesium hydroxide should be avoided since calcium and magnesium complexes have low water-binding capacity.

Since the upper pH limit of food products is about 8 because of the accompanying soapy taste at a pH above 8, alkalinity of the mixture is adjusted to a pH of 7–8 with lactalbumin phosphate or any carboxylic acid such as lactic, acetic, capric, fumaric, citric, valeric, succinic, malic, and others listed in Publication 1274 by National Research Council of the National Academy of Sciences. It should also be remembered that since the mixture is to be dried, lower alkalinity must be maintained in order to avoid discoloration and development of off-flavor quality which would occur if the mixture of a high pH were to be subjected to temperatures in excess of about 150° F. for an appreciable period of time. Furthermore, high alkalinity should be avoided since at pH above about 10, protein breaks down and evolves hydrogen sulfide.

After the mixture is adjusted to a pH below 8, it is dried in any conventional manner which such as by spray-drying, which provides a free-flowing powder composition. Spray drying conditions, such as inlet and outlet temperatures in the spray drier, are not critical for the reason that lactalbumin or lactalbumin phosphate have been denatured in the initial heating step which was conducted at 140° F. to 220° F.

In order to illustrate the invention, following examples are presented below.

EXAMPLE I 5000 lbs. of an aqueous solution of cold condensed skim milk of 42% solids concentration, i.e., 2100 lbs. on dry basis, was added to a mixing kettle and 233 lbs. of lactalbumin phosphate was admixed with good agitation. The mixture was agitated until a good dispersion of lactalbumin phosphate in the skim milk was obtained at which time, a solution of 3.27 lbs. of sodium sulfite in 15.5 liters of water was added and agitation continued for another several minutes until sodium sulfite was uniformly distributed throughout the mixture. The mixture was then pumped through a steam injector at an approximate rate of 15 gals./min., the pumping taking 40 minutes to accomplish. The steam was regulated to maintain a product temperature of 190–200° F.

The mixture was returned to the kettle at a temperature of 188° F. and approximately 2540 lbs. of cold water was added to the kettle in order to dilute the mixture to about 30% solids. It should be apparent that amount of water added will vary depending on the dilution effect of steam. The mixture was cooled to 140° F. and approximately 132 liters of 5 N potassium hydroxide was added with agitation, which raised pH of the mixture to 9.0. This mixture was then maintained at about 150° F. for 30 minutes. 132 liters of 5 N potassium hydroxide is equivalent to 36,960 grams of potassium hydroxide or 15.8 grams of potassium hydroxide per pound of solids in the mixture.

In order to reduce alkalinity of the product below pH of 8, 194 pounds of lactalbumin phosphate was added to the mixture with good agitation, which amounts to 0.083 pound of lactalbumin phosphate per pound of solids in the mixture. Before spray-drying the mixture through a 76/20 nozzle, it was heated to a temperature of 140° F.

Protein-modified skim milk, prepared as above, has a viscosity in the range of 30–180 cps., measured at 25° C. by Brookfield viscosimeter, when diluted to 20% solids concentration. In contrast, regular or unmodified skim milk has a viscosity of about 10 cps., measured at 25° C., when diluted to the same 20% solids concentration.

EXAMPLE II

Procedure of Example I was repeated with the exception that sodium sulfite was omitted. Protein-modified skim milk prepared without sodium sulfite has a viscosity in the range of 30–100 cps. measured at 25° C., when diluted to 20% solids concentration.

What is claimed is:

1. Process for preparing protein-modified skim milk product comprising:
   (a) maintaining in the temperature range of 140–220° F. an aqueous mixture of skim milk and a protein selected from lactalbumin, lactalbumin phosphate and mixtures thereof in relative proportion of 1 to 30 parts by weight of skim milk solids for each part by weight of said protein, for a period until a rehydratable curd is formed, and
   (b) adding to said mixture enough of an alkali containing a monovalent cation to bring pH of the mixture in the range of 7.5 to 9.5 while maintaining the mixture at a temperature in the range of 130° F. to 150° F. for a period of time sufficient to rehydrate the complexes so that they are caapble of binding 4 to 5 times, and more, water than unmodified skim milk solids.

2. Process of claim 1 wherein said period of time to rehydrate the complexes is from a few minutes to sixty minutes, the relative amount of the ingredients is from 2 to 20 parts skim milk solids for each part of the protein, the process including the step of adjusting pH of said mixture to from 5 to 7, if necessary, prior to addition of said alkali in order to promote complex formation.

3. Process of claim 2 including the step of admixing up to 2.5%, on dry basis, of a reducing agent with the mixture prior to addition of the alkali, the skim milk being condensed skim milk.

4. Process of claim 3 wherein said protein is lactalbumin phosphate, and said reducing agent is sodium sulfite, the process including the steps of reducing pH of said mixture below a pH of 8 following rehydration, and then drying said mixture.

5. Process of claim 3 which includes the step of diluting the mixture with water to a solids concentration of 20% to 40% prior to addition of said alkali.

6. Process of claim 5 wherein the skim milk added to form said mixture is at a temperature below 80° F.

7. Process of claim 6 including the step of heating said mixture, prior to said dilution step, to a temperature of 180° F. to 200° F. in order to accelerate the reaction between skim milk solids and said protein.

8. Process of claim 4 wherein said heating step is conducted at 180° F. to 200° F. for a period of up to five minutes and pH of said mixture is 7 to 8 following rehydration.

9. Process for preparing protein-modified skim milk product comprising preparing a mixture of admixing skim milk in amount of 1 to 30 parts by weight of skim milk solids for each part of a protein selected from lactalbumin, lactalbumin phosphate and mixtures thereof; heating said mixture at a temperature of 140° F. to 220° F. until a rehydratable curd is formed; diluting said mixture with water to solids concentration of 20% to 40%; adding with agitation enough alkali containing a monovalent cation to raise pH of said mixture to from 7.5 to 9.5 while maintaining for at least 5 minutes said mixture at 130° F. to 150° F.; adjusting pH of the mixture to below 8; and drying said mixture.

10. Process of claim 9 including the step of admixing up to 2.5%, on dry basis, of a reducing agent with said mixture prior to said heating step, amount of skim milk solids being 2 to 20 parts for each part of said protein, said mixture is heated for a few minutes to a temperature of 180° F. to 200° F., the solids concentration on dilution being 25% to 35%, and the pH range upon addition of alkali being in the range of 8 to 9.

11. Process of claim 10 wherein pH of said mixture is initially adjusted to a value in the range of 5 to 7.

12. Process of claim 10 wherein said skim milk is condensed skim milk of 30–45% solids concentration which is at a temperature below 80° F., said protein is lactalbumin phosphate, said reducing agent is sodium sulfite, the final step of adjusting the pH is made with lactalbumin phosphate to a value in the range of 7 to 8 and wherein the drying step is accomplished by spray-drying.

13. Process of claim 12 wherein said skim milk solids is casein.

14. A process comprising heating in a temperature range of 140–220° F., until rehydratable curd is formed, an aqueous mixture of casein and a protein selected from lactalbumin and lactalbumin phosphate and mixtures thereof; amount of casein on dry basis being in the range of 1–30 parts by weight for each part of said protein; adding with agitation enough alkali containing a monovalent cation to raise the pH of said mixture to 7.5–9.5 while maintaining, for at least 2 minutes, said mixture at 130° F.–150° F.; adjusting pH of the mixture to below 8; and drying said mixture.

15. Process of claim 14 including the step of admixing up to 2.5%, on dry basis, of a reducing agent with said mixture prior to said heating step; and the step of diluting said mixture with water to a solids concentration of 20–40% before addition of the alkali.

16. Process of claim 15 wherein pH of said mixture is initially adjusted to a value in the range of 5–7.

17. A modified skim milk product prepared by the process of claim 7.

18. A modified skim milk product prepared by the process of claim 3.

References Cited

UNITED STATES PATENTS

| | | | |
|---|---|---|---|
| 2,507,480 | 5/1950 | McDonald et al. | 99—116 |
| 2,708,166 | 5/1955 | Tumerman et al. | 99—57 |
| 3,269,843 | 8/1966 | McKee et al. | 99—94 |
| 2,708,633 | 5/1955 | Simpson et al. | 99—54 |
| 3,518,090 | 6/1970 | Swanson | 99—54 X |
| 3,528,818 | 9/1970 | Tumerman et al. | 99—56 |
| 2,714,069 | 7/1955 | Stuart et al. | 99—117 |

S. LEON BASHORE, Primary Examiner

A. L. CORBIN, Assistant Examiner

U.S. Cl. X.R.

99—87, 108, 109, 139